United States Patent

Berlincourt

[15] 3,699,484

[45] Oct. 17, 1972

[54] WIDTH EXTENSIONAL RESONATOR AND COUPLED MODE FILTER

[72] Inventor: Don A. Berlincourt, Chagrin Falls, Ohio

[73] Assignee: Vernitron Corporation, Bedford, Ohio

[22] Filed: June 24, 1970

[21] Appl. No.: 49,286

[52] U.S. Cl. ......................333/72, 310/8.1, 310/8.2, 310/9.5, 310/9.7

[51] Int. Cl. ............................H03h 9/16, H03h 9/20

[58] Field of Search .....333/70, 72; 310/8.2, 8.6, 9.5, 310/9.1, 8

[56] References Cited

UNITED STATES PATENTS

| | | | |
|---|---|---|---|
| 3,562,792 | 2/1971 | Berlincourt | 310/8 |
| 3,573,672 | 4/1971 | Fair | 333/72 |
| 3,517,350 | 6/1970 | Beaver et al. | 333/72 |
| 3,527,967 | 8/1970 | Dyer | 310/8.2 |
| 3,437,848 | 4/1969 | Borner et al. | 310/8.2 |
| 3,222,622 | 12/1965 | Curran | 333/72 |
| 3,384,768 | 5/1968 | Shockley | 310/9.5 |
| 3,453,458 | 7/1969 | Curran et al. | 310/9.1 |

*Primary Examiner*—Paul L. Gensler
*Attorney*—Eber J. Hyde

[57] ABSTRACT

Ceramic and crystal resonators and coupled mode filters are disclosed, which operate in the width extensional mode. The operating frequency is determined primarily by the width of the plate.

12 Claims, 7 Drawing Figures

PATENTED OCT 17 1972 3,699,484

INVENTOR.
DON A. BERLINCOURT
BY
ATTORNEY

WIDTH EXTENSIONAL RESONATOR AND COUPLED MODE FILTER

BACKGROUND OF THE INVENTION

1. Field of the Invention

This invention relates to resonators and electric wave filters and, more particularly, to a new type of trapped energy resonator, and to coupled mode bandpass filters employing such resonators.

2. Description of the Prior Art

Coupled mode filters, known in the prior art, have a plurality of similar thickness controlled resonators formed on a single plate of a piezoelectric crystal, typically quartz, or piezoelectric ceramic. Each resonator is established by a pair of small electrodes in registration on opposite faces of the plate. The resonance vibrations of each resonator, which may be thickness extensional or thickness shear, are confined to the area under the electrodes and immediately surrounding the electrodes by the energy trapping principle. Such trapped resonators have heretofore been known only for thickness modes. Modes with propagation in the plane of the plate, in cases allowed by crystallographic symmetry, are only very weakly excited with the electrode configurations employed in the prior art. The prior art thickness mode resonators are placed sufficiently close together so that there is acoustic coupling to adjacent resonators, thereby producing the bandpass characteristic. For a more detailed treatment of thickness mode coupled mode filters, reference may be had to the following publications:

M. Onoe and H. Jumonji, Analysis of Piezoelectric Resonators Vibrating in Trapped-Energy Modes, Electronics and Comm. Eng. (Japan), Vol. 48 No. 9, September 1965, pp. 84–93.

R. A. Sykes, W. L. Smith, W. J. Spencer, Monolithic Crystal Filters, 1967 IEEE International Convention Record, Part II, pp. 78–93.

Prior art monolithic coupled mode filters offer advantages of small size, reliability, and low cost. However, they have been limited by practical consideration to frequencies generally above about 4 mHz.

Bandpass filters operating at lower frequencies are widely used. For example, consider amplitude modulation radio receivers. These receivers have intermediate frequencies falling generally at 455 kHz or 262 kHz. They are constructed of inductors and capacitors generally in the form of tuned interstage coupling transformers, or they employ a plurality of individual piezoelectric ceramic disc resonators operating in the radial mode interconnected to form a filter. The large number of individual components requiring individual handling lead to cost, size, and reliability problems. The radial mode ceramic resonators are difficult to support since all points except the center of the disc must be free to vibrate parallel to the face of the disc for the fundamental radial mode. It is highly desirable to have the advantage of monolithic filter design at these lower frequencies, and to have resonator devices which operate at these frequencies which may be supported at peripheral areas without interfering with the desired resonant vibrations.

Accordingly, an object of this invention is to provide a new type of resonator and a new type of monolithic coupled mode filter which are suitable for use at lower frequencies and have the advantages of small size and low cost.

Another object of this invention is to provide a resonator and a monolithic filter which can withstand severe mechanical shock and vibration without damage.

SUMMARY OF THE INVENTION

There is provided a piezoelectric resonator comprising an elongated plate of piezoelectric material which is adapted to vibrate in the width direction (propagation and particle displacement parallel to the width) when subjected to an alternating electric field. Electrodes are attached to surfaces of the plate remote from the ends, and are so located that they are adapted to apply to the plate an alternating electric field which will induce such width vibrations. The electrodes, together with the piezoelectric material adjacent to the electrodes, establish an energy-trapped piezoelectric resonator having resonance frequency primarily controlled by the width of the plate. The plate may be supported at the ends, which do not vibrate at the operating resonance frequency of the resonator. The supports may be of energy-absorbing material to damp unwanted length related vibrations.

Additional electrodes may be provided to form additional width mode resonators, and the spacing between adjacent resonators may be sufficiently small to provide acoustic coupling to form a bandpass filter with center frequency determined primarily by the width of the plate.

DESCRIPTION OF THE PREFERRED EMBODIMENTS

Figures 1, 1A, 1B, 2:
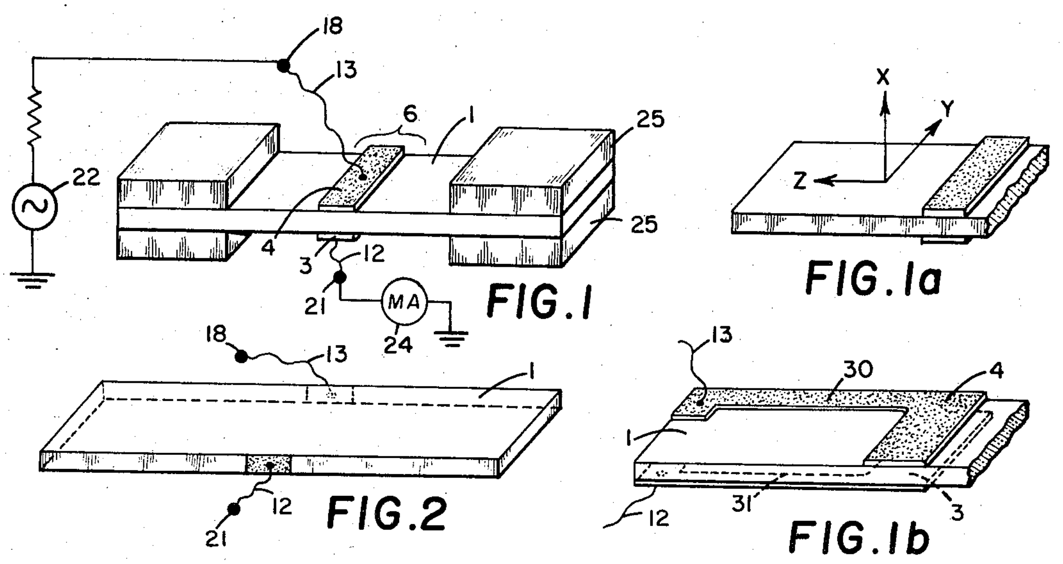
FIG. 1 illustrates a resonator constructed according to this invention connected in a test circuit.
FIG. 1*a* shows one suitable orientation of a quartz crystal plate that may be used for the resonator of FIG. 1.
FIG. 1*b* shows a variation in the manner of connecting leads to the electrodes in FIG. 1.
FIG. 2 illustrates a resonator having a different electrode arrangement.

FIG. 1 shows a resonator according to this invention. Piezoelectric plate 1 may be suitably cut from a piezoelectric crystal or may be formed of suitable ceramic material and poled in the thickness direction. Among suitable ceramic materials are solid solutions of lead zirconate and lead titanate, barium titanate, and lead metaniobate. Modified lead zirconate-lead titanate compositions particularly suitable for this use are disclosed in U.S. Pats. Nos. 3,006,857, Kulcsar, and 3,179,594, Kulcsar et al.

Electrodes 3, 4 are secured to the major faces of plate 1 near the central portion thereof. They may be formed by various known electroding techniques, but preferably by vacuum deposition of metal. When a ceramic plate is used it may be polarized by applying the polarizing voltage to the opposed electrodes. This results in piezoelectric activity only in the region adjacent to the electrodes. Alternatively, the polarizing voltage may be applied to temporary electrodes, partially or completely covering the major faces, and this may be done prior to formation of the final electrodes.

Thin wires 12, 13 are soldered or otherwise attached to the electrodes at the centers thereof for operation at the fundamental of the width mode. For operation at the first excited overtone, the connections may be made about one-sixth of the way in from either edge, or at the center. The other ends of the wires are secured to terminals 18, 21, which are shown in schematic form. In practice, suitable terminals may be supported by and extend through the walls of a protective housing and support for the plate 1, not shown.

The resonator of FIG. 1 is shown connected in a test circuit comprising variable frequency signal generator 22 and current meter 24.

When an alternating signal voltage is applied between electrodes 3, 4 by generator 22, the well-known piezoelectric effect results in a tendency of the piezoelectric material in the region between electrodes to vibrate in synchronism with the signal. Thus, if the frequency of generator 22 is varied through a sufficiently wide range of frequencies, a plurality of mechanical resonances may be excited in sequence, and detected by current peaks indicated at 24. If plate 1 is a ceramic plate, the lowest frequency resonance is a length extensional resonance. At this frequency the length of the plate is equal to one-half wave length for extensional wave propagating in the length direction. The plate as a whole elongates and contracts in synchronism with the applied signal, with maximum strain but minimum displacement occurring at the center of the plate. The entire plate, therefore, acts as a resonator. Length extensional overtones also may be excited.

At a higher frequency, a width extensional resonance may be excited, and it is this mode which is used in the present invention. Alternatively, width extensional overtones are employed. Due to energy trapping, the vibrations parallel to the width occur only under and relatively close to the electrodes. Thus, electrodes 3 and 4, together with the piezoelectric material therebetween, establish a width extensional resonator 6.

It should be noted that, unlike prior art trapped energy resonators, the resonator of FIG. 1 is free of restraint in both the width and thickness directions of the plate.

The length of the plate should be selected so that length extensional mode overtones do not fall close to the desired width mode resonance. Furthermore, the length mode vibrations may be damped by pads or blocks of vibration absorbing material 25 attached to or pressed against the plate 1 at the end areas. Pads 25 may be made of silicone rubber having high vibration absorbing characteristics such as SYLGARD No. 188 made by Dow Corning or they may be made of epoxy resin. The pads may also constitute the supporting means for plate 1 within a protective housing not shown. This relieves leads 12, 13 of the burden of supporting plate 1 and provides a resonator which can withstand severe mechanical shock and vibration without damage.

Since the width extensional mode is employed in the operation of this resonator the location of the desired resonance in the frequency spectrum is determined by selecting suitable width for plate 1. If desired, the plate may be made slightly oversized in width and then final adjustment to frequency may be made by grinding or otherwise removing piezoelectric material from the edge surfaces in the vicinity of the resonator.

This invention is not confined to the use of ceramic plates. Any suitable piezoelectric material may be used, for example, a plate of X-cut quartz, as shown in FIG. 1*a*. With electrodes perpendicular to the X axis, as shown, the only piezoelectric excitation in quartz is extensional, along the Y and X axes. The plate is oriented so that the Y axis is parallel to the width. Thus, the desired width extensional vibrations may be induced. This arrangement minimizes difficulties from length extensional vibrations because piezoelectric excitation along the Z axis is absent.

FIG. 1b shows an alternate means for making electrical connections to the electrodes of FIG. 1 and similar means may be used in other embodiments. A narrow strip of conducting material 30 is attached to the plate and extends from electrode 4 to the end of the plate where lead 13 is attached. Similarly, conducting strip 31 extends from electrode 3 to the end of the plate where conductor 12 is attached. Since there is no vibration of the plate at its ends at the operating frequencies of the resonator, the attachment of the leads, as shown, can have no undesirable influence. Preferably, in this constructing the plate is polarized only in the region of the resonator and the immediate surroundings and this is done prior to application of conducting strips 30 and 31.

Figure 3:
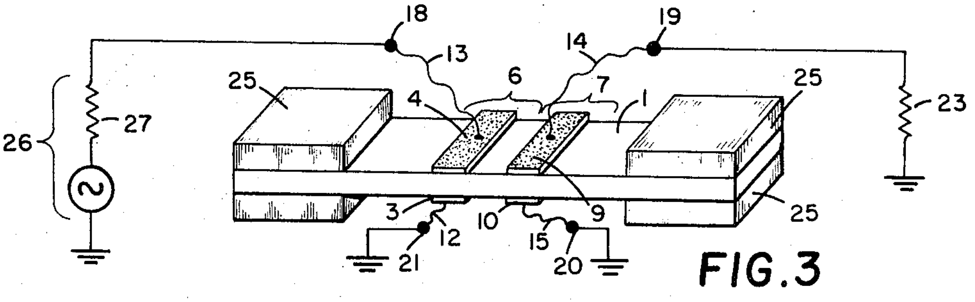
FIG. 3 illustrates a coupled mode filter employing two resonators of the type shown in FIG. 1.
Figure 5:
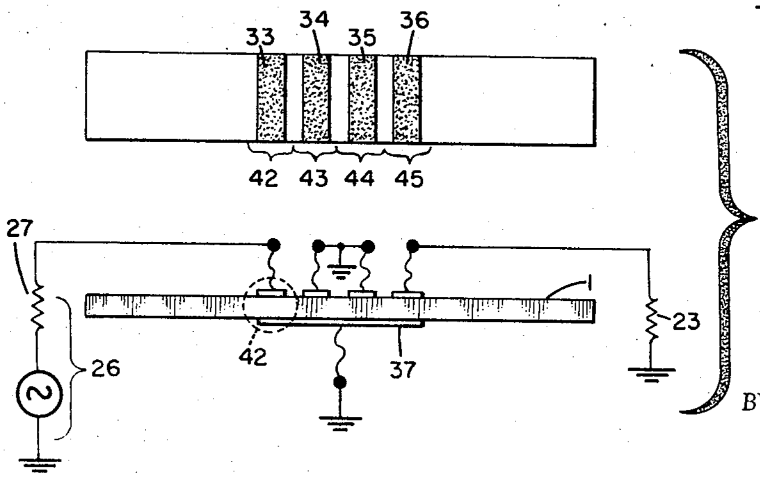
FIG. 5 illustrates a coupled mode filter similar to the filter of FIG. 3 but having four resonators.

In all figures the electrodes are shown extending to the edges of the surfaces on which they are mounted. However, for convenience in manufacturing, it may be desirable to make the electrodes slightly smaller so that they do not quite reach those edges. In the embodiments of FIGS. 1, 3, 5 this reduction in the electrode dimensions may be desirable also because it will improve slightly the electromechanical coupling of the resonator.

The electrical impedance of the resonator of FIG. 1 depends on the thickness of the plate. Thus, the impedance may be controlled in design by selecting suitable thickness. The minimum thickness is determined by practical mechanical considerations. As, the plate thickness is increased, approaching one-half wave length, the resonator operates in a combination of width and thickness modes.

In applications where still higher electrical impedance is desired, the piezoelectric plate may be provided with electrodes on the edge faces as shown in FIG. 2. If the plate is cut from crystal material, the orientation must be suitably selected to provide piezoelectric action in the width mode. If the plate is ceramic, it should be polarized through the width. With this electrode arrangement, the electrical impedance varies in proportion to the width of the plate.

FIG. 3 shows a coupled mode filter employing two width mode resonators of the kind shown in FIG. 1. Electrodes 3, 4 establish resonator 6 as in FIG. 1. Electrodes 9, 10 establish an additional resonator 7. A signal source 26 having resistance 27 selected to terminate the filter properly is shown connected to resonator 6 through input terminals 18, 21. Electrodes 9, 10 of resonator 7 are connected by flexible conductors 14, 15 to output terminals 19, 20. A terminating resistor 23 is connected to output terminals 19, 20. Plate 1 may be supported on damping pads as in FIG. 1.

Due to the close proximity of the resonators, acoustic coupling exists between resonators. Thus, when resonator 6 is excited by generator 26, at or near the selected width resonance frequency, energy is acoustically coupled to resonator 7 which generates an electric signal across load 23. When the spacing between resonators is sufficiently close "critical coupling" or "overcoupling" provides a bandpass characteristic.

Figure 4:
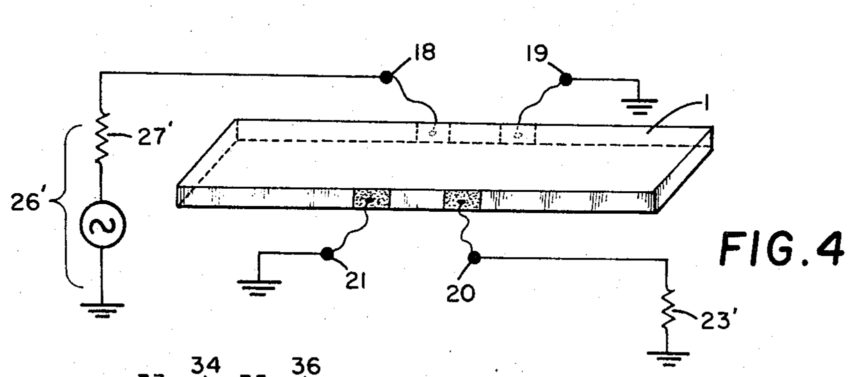
FIG. 4 illustrates a two resonator coupled mode filter having a different electrode arrangement.

FIG. 4 shows a two resonator filter similar to the filter of FiG. 3 but with electrodes on the edges of the plate, as in FIG. 2, in order to obtain a higher electrical impedance. Plate 1 may be supported in the same manner as shown in FIG. 1.

FIG. 5 shows a four resonator coupled mode filter. Plate 1 may be mounted as shown in FIG. 1. The four resonators correspond to electrodes 33, 34, 35, 36 on the upper surface of plate 1. The counter-electrodes on the lower face have been merged into one continuous electrode 37. The operation is substantially the same as with separate electrodes, although it may be necessary to readjust the spacing of electrodes 33 to 36 to produce the same bandwidth. Thus, for example, electrode 33 and the portion of counter electrode 37 opposite 33 act as, and are equivalent to, a pair of separate electrodes which, together with the adjacent piezoelectric material, establish a width mode resonator, as in FIG. 3. The use of a common electrode has the advantage of reducing the number of connecting leads that must be attached to the electrodes, thereby reducing the cost and increasing the reliability. However, care must be taken to avoid significant impedance in the circuit from common electrode to ground.

The common counter-electrode arrangement may also be used in the embodiments of FIGS. 3 and 4, and, if desired, separate electrodes may be used in place of common electrode 37 in FIG. 5.

The filters of this invention differ structurally from prior art coupled mode filters in that the electrodes extend to both edges, or nearly to the edges, of the surface to which they are attached.

Functionally, the action of the resonators of this invention differs from the prior art in that the present resonators in their selected mode are free to vibrate in both the width and thickness directions of the plate, whereas resonators of the prior art coupled mode filters in their selected mode are free only in the thickness direction. The wave propagation in a resonator, operating according to this invention, is parallel to the width dimension of the plate. Prior art trapped-energy resonators and coupled mode filters have wave propagation parallel to the thickness or smallest dimension os the plate.

For best results in coupled mode filters, the width of plate 1 should be uniform along the length in the vicinity of the resonators within a percentage very small compared to the percent bandwidth of the filter. Departures from uniform thickness and length of the plate have little or no effect on performance of the filter. In contrast, for a thickness mode coupled mode filter (prior art) the lateral dimensions need not be carefully controlled, but the thickness must be held to very close limits.

At frequencies well above the operating frequency of the filter, thickness extensional resonances and overtones may be excited. In general, however, the electrodes utilized in this invention will not provide conditions suitable for operation as a thickness mode coupled mode filter.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A piezoelectric resonator comprising:

an elongated plate, at least a portion of which remote from the ends thereof is piezoelectric and adapted to vibrate in extension parallel to the width when subjected to an alternating electric field;

a pair of electrodes on opposite surfaces of said plate located only at substantially the central portion of the length of said plate and extending substantially to the edges of said plate so that they are adapted to apply to a piezoelectric portion of the plate remote from the ends thereof an alternating electric field in a direction which will induce said width extensional vibrations, said electrodes establishing with said piezoelectric material adjacent thereto a piezoelectric resonator having a resonance frequency controlled by the width of the plate, and whereby energy trapping is achieved.

2. A resonator as described in claim 1 in which the electrodes are on the major surfaces of the plate.

3. A resonator as described in claim 1 in which the electrodes are on the long edge surfaces of the plate.

4. A resonator as described in claim 1 in which the plate comprises lead zirconate-lead titanate ceramic.

5. A resonator as described in claim 1 in which the plate is supported at end areas thereof by acoustic damping material.

6. A resonator as described in claim 1 in which the plate comprises X-cut quartz crystal with the width of the plate parallel to the Y axis of the crystal.

7. A piezoelectric bandpass filter comprising:

an elongated plate having substantially uniform width, at least a portion of the plate remote from the ends thereof being piezoelectric and adapted to vibrate in extension parallel to the width when subjected to an alternating electric field;

a plurality of pairs of electrodes on opposite surfaces of said plate located only at substantially the central portion of the length of said plate and extending substantially to the edges of said plate so that the electrodes of each pair are adapted to apply to a piezoelectric portion of the plate remote from the ends thereof an alternating electric field which will induce said width extensional vibrations, each pair of electrodes establishing with said piezoelectric material adjacent thereto a piezoelectric resonator having a resonance frequency primarily controlled by the width of the plate, and whereby energy trapping is achieved; and the spacing of adjacent pairs of electrodes being sufficiently small that acoustic coupling exists between adjacent resonators.

8. A filter as described in claim 7 in which the electrodes are on the major surfaces of the plate.

9. A filter as described in claim 7 in which the electrodes are on the long edge surfaces of the plate.

10. A filter as described in claim 7 in which the plate comprises lead zirconate-lead titanate ceramic.

11. A filter as described in claim 7 in which the plate is supported at end areas thereof by acoustic damping material.

12. A filter as described in claim 7 in which the plate comprises X-cut quartz crystal with the width of the plate parallel to the Y axis of the crystal.

* * * * *